Jan. 1, 1946. H. F. MALONE 2,391,992
TEMPERATURE INDICATOR
Filed March 9, 1942 2 Sheets-Sheet 1
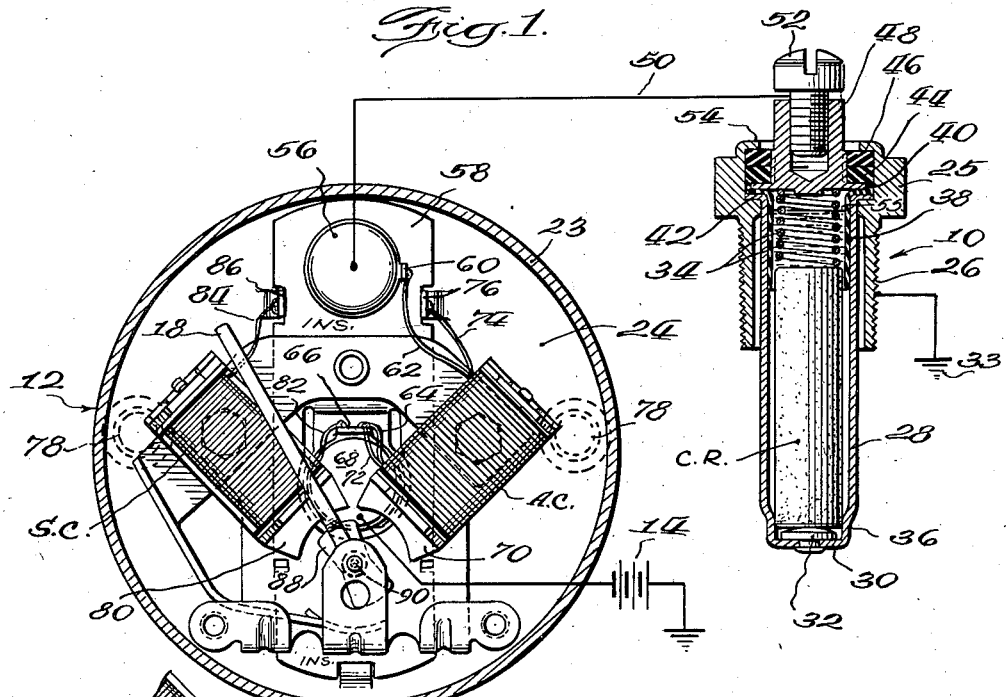
Inventor
By Homer F. Malone Jan. 1, 1946.  H. F. MALONE  2,391,992
TEMPERATURE INDICATOR
Filed March 9, 1942  2 Sheets-Sheet 2

Inventor:
Homer F. Malone
By
Williams, Bradbury & Hinkle
Attys

Patented Jan. 1, 1946

2,391,992

UNITED STATES PATENT OFFICE 2,391,992

TEMPERATURE INDICATOR

Homer F. Malone, Chicago, Ill., assignor to Stewart-Warner Corporation, Chicago, Ill., a corporation of Virginia Application March 9, 1942, Serial No. 433,882

9 Claims. (Cl. 73—362)

My invention relates to indicators and is more particularly concerned with indicators for showing variations in temperature, such as occur, for example, in the cooling system of an automobile engine.

An object of my invention is to provide a new and improved temperature indicator.

Another object of my invention is to provide a simple, inexpensive indicator having a minimum of moving parts and providing long and trouble-free service.

Another object of my invention is to provide an indicator having a new and improved arrangement of actuating coils.

Another object of my invention is to provide an indicator having a new and improved variable resistance.

Another object of my invention is to provide an indicator having a new and improved receiving unit.

Another object of my invention is to provide an indicator having a new and improved sending unit.

Another object of my invention is to provide an indicator wherein the receiving unit and sending unit have unique and compensating characteristics whereby the indicator accurately shows the variations in temperature being indicated.

Other objects and advantages will become apparent as the description proceeds.

In the drawings

Fig. 1 is a sectional view of an indicator embodying my invention and showing diagrammatically the manner in which the indicator is connected into an electrical circuit.

Fig. 2 is a side elevation of the receiving unit shown in Fig. 1 with part of the housing cut away.

Fig. 3 is a partial sectional view showing the relationship of the armature and coils of the receiving unit.

Fig. 4 is a partial section taken on the line 4—4 of Fig. 3 and illustrates the mounting of the pointer of the receiving unit.

Referring to Fig. 1, it will be seen that my new and improved indicator comprises in general a sending unit 10 and a receiving unit 12 in electrical communication with each other and with a source of electric energy, such as the battery 14. In the particular embodiment of my invention which I have chosen to illustrate, the sending unit 10 is designed to be screwed into the motor block of an automobile engine and the receiving unit 12 is adapted to be located on the instrument board of the automobile.

Figure 8:
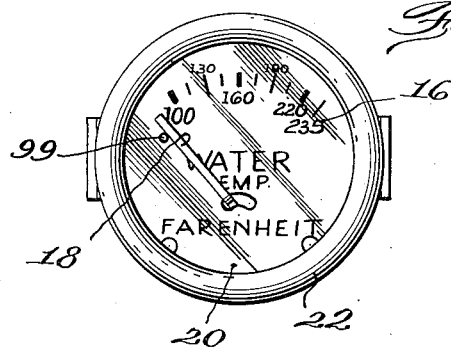
Fig. 8 is a front view of the receiving unit.

As clearly shown in Figs. 2 and 8, the receiving unit is provided with a dial 16 carrying indicia indicating the temperature of the water in the cooling system and a pointer 18 movable relative to this indicia to indicate at any instant the then condition of the engine cooling water. The dial and pointer are preferably protected by a glass face plate 20, secured in place by a bezel 22, detachably connected to a cup 23 having a base 24.

The sending unit 10 comprises a hollow nut 25 threaded at 26 for screwing into a suitable opening provided in the block of the automobile engine. A tubular body 28 is supported in the nut 25 and is closed at one end as indicated at 30. The body 28 is preferably of metal or other electrical conducting material and is provided with an electrical contact 32, which is grounded to the frame of the automobile through the body 28 and nut 25, as indicated at 33. The contact 32 may be omitted and the resistor rest directly against the closed end 30 which could be indented to provide a contact portion shaped generally like the resistor-engaging part of contact 32.

A carbon resistor C. R. is located in the body 28 and is pressed against the electrical contact 32 by a spring 34. The tubular body 28 is made of reduced diameter adjacent its closed end, as indicated at 36 to center the carbon resistor relative to this body and an insulating sleeve 38 is interposed between the other end of the carbon resistor and the body 28 so that only that end of the carbon resistor which engages the contact 32 and the reduced portion 36 of the body 28 is in electrical communication with this body.

Spring 34 abuts the metallic disc 40, which is of smaller diameter than the internal diameter of the nut 25 and is electrically insulated therefrom by the turned over flange 42 of the sleeve 38 and by insulating washers 44 and 46. The disc 40 has a threaded extension 48 constituting an electrical terminal, to which conductor 50 can be secured by screw 52. The thin lip 54 of the nut 25 is turned inwardly to hold the parts of the sending unit in assembled relation. During the assembly operation, the sending unit is preferably filled with transformer oil or other suitable liquid up to a point indicated by line 55 so that the temperature of the carbon resistor C. R. will at all times correspond closely to the temperature of the cooling water. The turning over of the lip 54 effectively seals this liquid in place and prevents its escape when the unit is placed or used in a horizontal or upside down position.

The conductor 50 is attached to a terminal 56 mounted in an insulating strip 58 attached to the base 24 of the receiving unit. The terminal 56 is provided with an upstanding ear 60, to which one end of conductor 62 is soldered or otherwise attached. The other end of conductor 62 is attached to or forms a part of an actuating coil A. C., whose other end is attached by wire 64 to the ear 66 of a second terminal 68. These terminals are preferably separated by a second insulating strip 69. The actuating coil is wound around the magnet core 70 and a balance coil B. C. (Fig. 5) is wound around the actuating coil although the balance coil may be located between the core and actuating coil if desired. The lead 72 connects one end of the balance coil to the terminal ear 66 and a second lead 74 grounds the other end of this balance coil to an ear 76 formed integral with or attached to a plate 77 grounded to the base 24. The base 24 is provided with attaching studs 78 for securing it to the instrument board of the automobile and for grounding this base to the automobile frame.

A stand-by coil S. C. is wound on a second magnet core 80 whose axis forms an angle of approximately 90° with the axis of the magnet core 70. One end of the stand-by coil is connected to terminal ear 66 by lead 82 and the other end of this stand-by coil is grounded through lead 84 to ear 86 integral with or attached to the plate 77.

The magnet cores 70 and 80 have arcuate shaped adjacent ends partially surrounding an hour glass shaped armature 88 mounted on pointer shaft 90, rotatably mounted in bearings 92 and 94, carried by a U-shaped support 96, attached to the base 24. The pointer 18 is carried by the shaft 90 for rotation therewith and a laterally projecting weight 98 is attached to the pointer or pointer shaft to urge the pointer toward the zero position, that is, the position shown in Fig. 8 of the drawings.

The carbon resistor C. R. is a hard rod-like piece of material composed mainly of carbon, silicon, titanium, magnesium and molybdenum, but containing small quantities or traces of other elements. This carbon resistor is formed into a hard rod-like member by compressing and sintering the ingredients of which it is made and is sold commercially under the name of carbon resistor.

These carbon resistors have the property of offering relatively high resistance to the flow of an electrical current when the resistor is cold and of decreasing their resistance as they are heated. This decrease in resistance is not uniform for equal changes in temperature throughout the temperature range and it has heretofore been impracticable to use such resistors in indicators. For example, the resistance of a given carbon resistor at a temperature of 100° F. is 100 ohms, at 130° F. is 80 ohms, at 160° F. is 62 ohms, at 190° F. is 50 ohms and at 220° F. is 42 ohms, and my indicator has been especially designed to provide uniform pointer movements for equal changes in temperature of the cooling water despite the varying rate of change of resistance of the carbon resistor or other resistance means.

Figure 5:
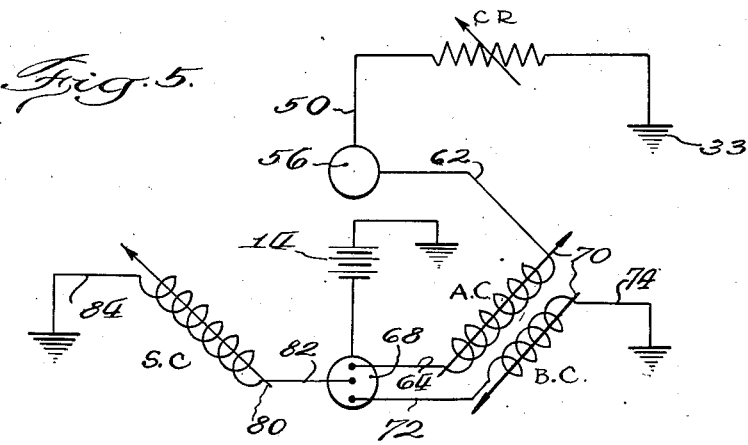
Fig. 5 is an electrical diagram showing the manner in which the various electrical elements of the indicator are connected into an electric circuit.

Referring particularly to the wiring diagram of Fig. 5, it will be seen that the actuating coil A. C. exerts a pull on the armature in the direction of the arrow passing through this coil and this force is directly opposed by the balance coil B. C., which is wound on the same core as the actuating coil, so that the actual pull on the armature exerted by this core is the algebraic sum of the forces exerted by the actuating coil and the balance coil. The stand-by coil S. C. exerts a pull on the armature in the direction of the arrow passing through this coil.

When my novel indicator is applied to an automobile the electrical circuits of the indicator would ordinarily be connected to the ignition system of the automobile through the ignition switch so that the indicator functions only when the ignition switch is closed. In such an installation the battery 14 indicated on the drawings would be the automobile battery forming part of the automobile ignition system and the grounds indicated on the drawings would be to the body and frame of the automobile. In other installations where a ground of this kind is not readily available it will be understood that return wires would be utilized in lieu of the grounded connections illustrated.

Figure 6:
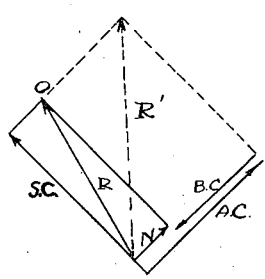
Fig. 6 is a vector diagram showing the forces exerted on the armature by the electrical coils for one condition of operation.

Assuming that the automobile engine has been standing idle for some time and that the water in the cooling system of this engine is cold when the automobile engine is started, the operation of my indicator is as follows: the carbon resistor C. R. being cold, offers relatively high resistance to the flow of current through the circuit, including this resistance, and the actuating coil A. C., so that the magnetic influence exerted on the core 70 by this coil is relatively small and is represented by the arrow A. C. in the vector diagram of Fig. 6. The balance coil B. C. and the stand-by coil S. C. are always connected directly between the battery and ground and the forces exerted by these coils are not affected by the variations in the resistance of the carbon resistor C. R. In Fig. 6 the force exerted by the balance coil is represented by the arrow B. C. and the algebraic sum of the arrows A. C. and B. C. is represented by the arrow N, which is the net or actual force exerted by the core 70 on the armature 88.

The arrow R represents the resultant of the forces indicated by the arrows N and S. C. and also represents the position assumed by the armature 88 and pointer 18. This position corresponds with the position of the 100° mark on the indicating dial 16 and accurately indicates the temperature of the engine cooling water to the automobile driver.

The dotted arrow R' indicates the resultant of the forces exerted by the coils A. C. and S. C. and clearly shows that the effect of the balance coil B. C. is greatly to reduce the influence of the actuating coil A. C. on the position of the armature and pointer at the lower or cold end of the scale.

As the engine continues to operate, the cooling water heats up. This heat is transmitted to the carbon resistor C. R. and reduces the electrical resistance of this resistor. As this resistance decreases, the current through the actuating coil A. C. is increased, whereas the currents through the balance coil B. C. and stand-by coil S. C. remain the same. The result is that the core 70 exerts a stronger pull on the armature 88, tending to move this armature and pointer into alignment with the axis of this core.

Figure 7:
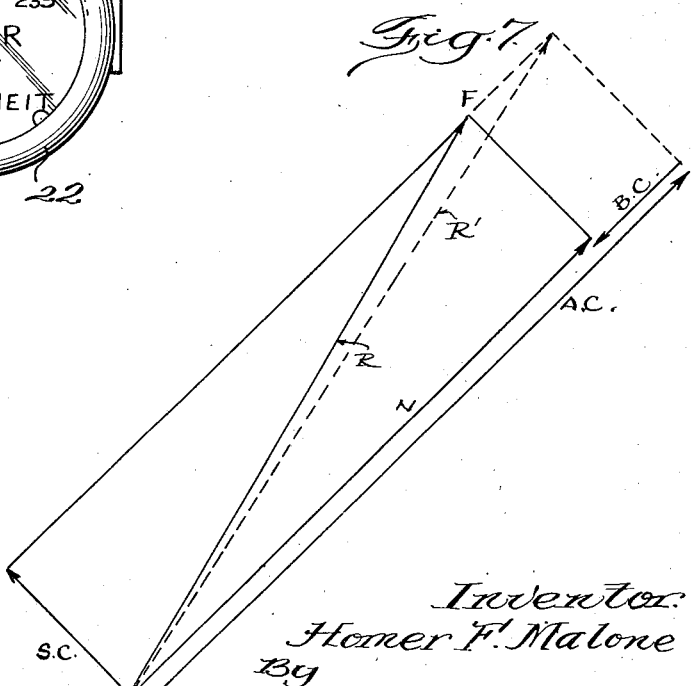
Fig. 7 is a vector diagram similar to Fig. 6, but showing the forces for a different condition of operation.

Fig. 7 is a vector diagram representing the forces exerted by the coils when the resistance of the carbon resistor is a minimum. The arrow S. C. is unchanged and likewise the arrow B. C. is unchanged, but the arrows A. C. and N are several times as long as the corresponding arrows N in Fig. 6 and the resultant R has grown several times and swung through an angle of approximately 60° so that the pointer would now accurately indicate the increased temperature of the water.

The dotted arrow R' indicates the position and strength of the resultant force acting on the armature if the balance coil B. C. were omitted. The vector diagrams 6 and 7 clearly show that the effect of the balance coil B. C. on the resultant R is much greater at the cold or lower end of the scale than at the hot or high end of the scale and this makes it possible to use a strong actuating coil which will accurately respond to the relatively small changes in resistance of the carbon resistor C. R. as the temperature of the water increases and which, at the same time, prevents this strong actuating coil from producing undue movement of the pointer at the lower end of the scale and when the same changes in water temperature produce much greater changes in the electrical resistance of the carbon resistor C. R. When the engine ignition switch is opened, the coils are de-energized and the weight 98 returns the pointer 18 to the idle or zero position shown in Fig. 8, in which position the pointer engages stop pin 99.

I wish to call attention particularly to the simplicity of my indicator and the fact that it contains a minimum number of moving parts to become damaged or get out of adjustment. Likewise there are no sliding contacts or contacts which are opened and closed during the operation of the instrument. All contacts are permanently engaged throughout the life of the indicator and there is a minimum opportunity for dirt, oxidation or other corrosive influences to impair contacts and impair the accuracy of the instrument.

While I have illustrated and described my invention as embodied in an instrument which is particularly adapted for indicating the temperature of the cooling water of an automobile engine, it is to be understood that my invention may be embodied in other instruments differing materially in construction from the instrument illustrated and described herein and adapted for the same or widely different uses. My novel indicator is readily adaptable to indicate any desired temperature variation within reason and the particular instrument shown in Fig. 8 was, in fact, designed for use in tanks, using ethylene glycol or other coolants capable of operating at temperatures above the boiling point of water.

I claim:

1. In a temperature indicator of the class described, the combination of a first circuit including an actuating coil and a carbon resistor placed in series relationship, a second circuit including a balance coil directly opposing said actuating coil, a third circuit including a stand-by coil exerting a force at an angle to the force exerted by said actuating coil, indicating means responsive to variations in magnetic force exerted by said coils, and means for connecting said circuits in parallel to a source of electrical energy, said stand-by coil having a constant magnetizing current throughout the operating range of the indicator.

2. A temperature indicator of the class described, comprising a carbon resistor exposed to temperature variations and variably changing its electrical resistance with variations in temperature, an actuating coil in series with said carbon resistor, a stand-by coil, said stand-by coil and actuating coil exerting magnetic forces angularly related to each other, a balance coil directly opposing said actuating coil, indicating means responsive to variations in magnetic forces exerted by said coils, and means for connecting said coils to a source of electrical energy, said stand-by coil and said balance coil each having a constant magnetizing current throughout the operating range of the indicator.

3. In an indicator of the class described, the combination of a first circuit including an actuating coil and a carbon resistor arranged in series relationship, a second circuit including a balance coil, a magnetic core common to said two coils, said coils being constructed and arranged to exert opposing forces on said core, a third circuit including a stand-by coil, a second core for said stand-by coil, said cores having adjacent ends and axes intersecting at an angle of approximately 90°, a pointer shaft, an armature for driving said shaft, said armature being near the adjacent ends of said cores and constructed and arranged to assume a position determined by the resultant of the forces exerted by said cores, a pointer movable with said shaft, indicia carrying means cooperating with said pointer, and means for connecting said circuits in parallel to a source of electrical energy, said stand-by coil and said balance coil each having a constant magnetizing current throughout the operating range of the indicator.

4. In an indicator of the class described, the combination of a rod-like carbon resistor of decreasing resistance with increasing temperatures, a tubular body enclosing said resistor and electrically connected to one end of said resistor, said body being adapted to contain liquid capable of transmitting heat but not electricity interposed between said resistor and body, means sealing said liquid in said body and forming an electrical connection for the other end of said carbon resistor, an actuating coil in series with said resistor, an armature movable in response to variations in magnetic force exerted by said actuating coil, a stand-by coil exerting a magnetic influence angularly related to the magnetic influence exerted by said actuating coil, a fixed magnetic force directly opposing said actuating coil, and indicating means actuated by variations in current through said carbon resistor and actuating coil.

5. In a temperature indicator of the class described, the combination of a first circuit including an actuating coil and a variable resistance placed in series relationship, a second and parallel circuit including a balance coil directly opposing said actuating coil, a third and parallel circuit including a stand-by coil exerting a force at an angle to the force exerted by said actuating coil, indicating means responsive to variations in magnetic force exerted by said coils, and means for connecting said circuits in parallel to a source of electrical energy.

6. A temperature indicator of the class described, comprising a resistor exposed to temperature variations and variably reducing its electrical resistance with increases in temperature, an actuating coil in series with said resistor, a stand-by coil, said stand-by coil and actuating coil exerting magnetic forces angularly related to each other, a balance coil directly opposing said actuating coil, indicating means responsive to variations in magnetic forces exerted by said coils, and means for connecting said coils to a source of electrical energy, said actuating coil and its resistor being connected in parallel with the other two coils.

7. In an indicator of the class described, the combination of a first circuit including an actuating coil and a variable resistance arranged in series relationship, a second circuit including a balance coil, a magnetic core common to said two coils, said coils being constructed and arranged to exert opposing forces on said core, a third circuit including a stand-by coil, a second core for said stand-by coil, said cores having adjacent ends and axes intersecting at an angle of approximately 90°, a pointer shaft, an armature for driving said shaft, said armature being near the adjacent ends of said cores and constructed and arranged to assume a position determined by the resultant of the forces exerted by said cores, a pointer movable with said shaft, indicia carrying means cooperating with said pointer, and means for connecting said circuits in parallel to a source of electrical energy, said armature assuming a position nearer alignment with said actuating coil for each decrease in resistance of said variable resistance.

8. In an indicator of the class described, the combination of a rod-like carbon resistor, a tubular body enclosing said resistor and electrically connected to one end of said resistor, said body being adapted to contain a quantity of liquid, means sealing said liquid in said body and forming an electrical connection for the other end of said carbon resistor, said carbon resistor having substantially the same pressure potential throughout the operating range of the indicator and decreasing in resistance with increases in temperature an actuating coil in series with said resistor, an armature movable in response to variations in magnetic force exerted by said actuating coil, a stand-by coil exerting a magnetic influence angularly related to the magnetic influence exerted by said actuating coil, a fixed magnetic force directly opposing said actuating coil, and indicating means actuated by variations in current through said carbon resistor and actuating coil.

9. In an indicator of the class described, the combination of a first circuit including an actuating coil and a carbon resistor arranged in series relationship, a parallel fixed resistance circuit including a balance coil, a magnetic core common to said two coils, said coils being constructed and arranged to exert opposing forces on said core, another parallel fixed resistance circuit including a stand-by coil, a second core for said stand-by coil, said cores having adjacent ends and axes intersecting at an angle of approximately 90°, a pointer shaft, an armature for driving said shaft, said armature being near the adjacent ends of said cores and constructed and arranged to assume a position determined by the resultant of the forces exerted by said cores, a pointer movable with said shaft, indicia carrying means cooperating with said pointer, and means for connecting said circuits in parallel to a source of electrical energy.

HOMER F. MALONE.